United States Patent
Chugg et al.

(10) Patent No.: US 8,879,650 B2
(45) Date of Patent: Nov. 4, 2014

(54) METHOD AND SYSTEM FOR CONTROLLING THE PEAK-TO-AVERAGE POWER RATIO OF ORTHOGONAL FREQUENCY-DOMAIN SIGNALS

(71) Applicant: TrellisWare Technologies, Inc. (020945), San Diego, CA (US)

(72) Inventors: Keith M. Chugg, La Canada, CA (US); Cenk Kose, La Jolla, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 0 days.

(21) Appl. No.: 13/662,769

(22) Filed: Oct. 29, 2012

(65) Prior Publication Data

US 2013/0107984 A1    May 2, 2013

Related U.S. Application Data

(60) Provisional application No. 61/553,043, filed on Oct. 28, 2011.

(51) Int. Cl.
| | |
|---|---|
| H04K 1/10 | (2006.01) |
| H04L 27/28 | (2006.01) |
| H04L 1/00 | (2006.01) |
| H04L 27/26 | (2006.01) |

(52) U.S. Cl.
CPC .......... H04L 27/2618 (2013.01); H04L 1/0042 (2013.01); H04L 1/0057 (2013.01)

USPC .......................................... 375/260; 375/259

(58) Field of Classification Search
CPC .. H04L 1/0042; H04L 1/0057; H04L 27/2618
USPC .......................................... 375/260
See application file for complete search history.

(56) References Cited

U.S. PATENT DOCUMENTS

| | | | | |
|---|---|---|---|---|
| 2001/0055320 | A1* | 12/2001 | Pierzga et al. | 370/480 |
| 2002/0114270 | A1* | 8/2002 | Pierzga et al. | 370/208 |
| 2010/0157786 | A1* | 6/2010 | Akita et al. | 370/210 |
| 2012/0263156 | A1* | 10/2012 | Abraham et al. | 370/338 |
| 2013/0139040 | A1* | 5/2013 | Pietraski et al. | 714/790 |

OTHER PUBLICATIONS

Chugg, K.M.; Köse, C.; Halford, T.R., "Constant modulus orthogonal frequency division multiplexing," Military Communications Conference, 2010—MILCOM 2010 , vol., no., pp. 1624-1631, Oct. 31, 2010-Nov. 3, 2010.

* cited by examiner

*Primary Examiner* — Erin File
(74) *Attorney, Agent, or Firm* — Kilpatrick Townsend & Stockton LLP (57) ABSTRACT

Systems and methods are presented for controlling the peak-to-average-power of a baseband orthogonal-frequency-domain multiplexing (OFDM) signal by designating a subset of the available subcarriers as information-bearing data-subcarriers, and loading remaining subcarriers by symbols that are a function of the symbols loading the data-subcarriers. At the receiver, the data-dependent subcarriers are optionally combined with data-subcarriers to increase error protection.

15 Claims, 8 Drawing Sheets

METHOD AND SYSTEM FOR CONTROLLING THE PEAK-TO-AVERAGE POWER RATIO OF ORTHOGONAL FREQUENCY-DOMAIN SIGNALS

CROSS-REFERENCES TO RELATED APPLICATIONS

This application claims benefit of priority under 35 U.S.C. §119(e) of U.S. Provisional Application No. 61/553,043, filed Oct. 28, 2011, the entire contents of which are incorporated herein by reference in their entirety for all purposes.

FIELD OF THE INVENTION

The present invention relates to systems and methods for controlling or eliminating the peak-to-average-power ratio of a multi-carrier modulator, in particular orthogonal frequency-domain multiplexing (OFDM) modulators, and methods of demodulating such signals.

BACKGROUND

Signal transmission over a wireless channel suffers from multipath propagation which causes symbols transmitted at different time instants to interfere with each other at a receiver, a phenomenon known as intersymbol interference (ISI). Such multipath ISI channels induce frequency-selective fading which can attenuate different frequencies of the transmit signal differently. Receiver techniques to mitigate the effects of frequency-selectivity so as to restore the originally transmitted signal are widely referred to as equalization. When the channel is frequency non-selective (i.e. frequency-flat), no ISI is experienced and equalization is accomplished by simple gain-control, adjusting the magnitude and the phase of the received signal.

An OFDM signal consists of multiple narrowband subcarriers that are mutually orthogonal to one another. This special structure of OFDM converts a frequency-selective channel into multiple parallel narrowband frequency-flat channels each of which affords a detection based on simple gain-control, obviating the need for complex equalization circuitry that would be required by single-carrier modulations.

When the individual narrowband signals combine, the OFDM waveform exhibits high peak-to-average-power-ratio (PAPR), a common figure that describes the magnitude variation of waveform samples. A high PAPR dictates the use of a linear transmit chain to avoid signal distortion that results in degraded error performance and spectral re-growth beyond the intended signal bandwidth. In particular, power amplifier (PA) characteristics exhibit a saturation of output power with increased input power—a nonlinear behavior. To ensure linearity with a high PAPR, the PA is operated away from saturation, i.e. with a power back-off. Operating with a power back-off results in decreased transmission range and reduced power efficiency; the latter defined to be the ratio of the output power to the input source power of the amplifier. When a large transmit power is required, the over-provisioning of the PA may render OFDM transmission infeasible. A multitude of OFDM PAPR reduction methods exist that generally offer rules for modifying the input or the output of the OFDM modulator to enforce tolerable levels of signal peak occurrence. Many of these rules alter the fundamental frequency-domain input-output relationship of the OFDM.

SUMMARY

A method and system is introduced that reduces or eliminates variation in magnitude of the baseband samples of an OFDM signal. In this method, half the subcarriers comprising an OFDM-symbol are loaded with parity-symbols that are derived from information-bearing data-symbols that load the remaining subcarriers. The resulting baseband OFDM signal is called a constant-modulus OFDM (CM-OFDM) signal. Some embodiments of the present invention provide the relative fractional power devoted to parity subcarriers to enforce the baseband constant-modulus (CM) condition.

Methods and systems for baseband CM-OFDM receivers (demodulators) are presented in which the received data-dependent parity signal is optionally combined with the data-only signal to increase reliability of information recovery.

A method and system of extending the CM-OFDM to allow a prescribed amount of maximum baseband magnitude variability in favor of reduced power in parity-symbols is also presented. The resulting method is called Controlled-Modulus OFDM (CoM-OFDM). The CM-OFDM signal can be interpreted as one configuration of a CoM-OFDM signal.

An object and advantage of the presented transmitter methods is to allow the use of a saturated transmit chain for OFDM signals.

Another object and advantage of the presented receiver methods is that the data-dependent parity signal can be used to recover the data symbols with increased reliability, or can simply be discarded for processing with reduced complexity.

Another object and advantage of the presented transmitter methods is to allow a continuously configurable trade-off of maximum baseband magnitude variation vs. parity-power expended to maintain this bounded variation.

DETAILED DESCRIPTION

Figure 1:
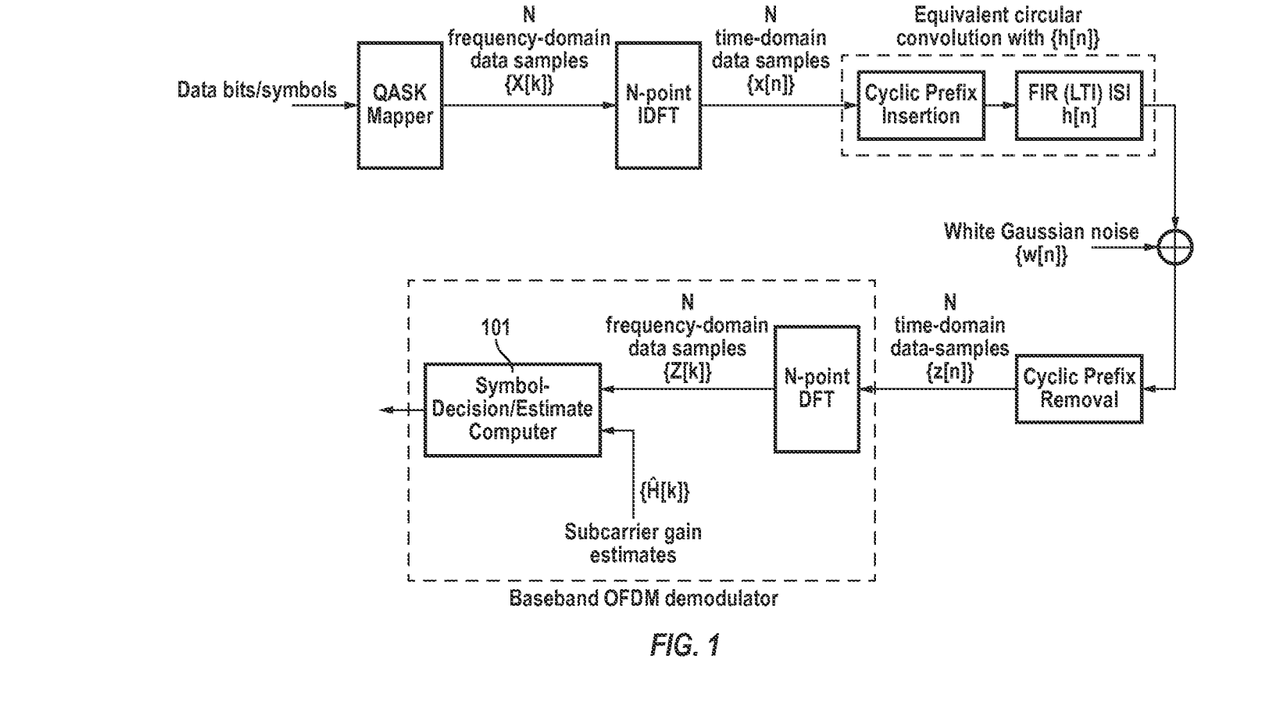
FIG. 1 describes an OFDM system model with cyclic-prefix (CP) insertion and an ISI channel.

FIG. 1 displays an OFDM system model with N subcarriers. The OFDM modulator accepts N quadrature amplitude shift-keyed (QASK) symbols, $\{X[0], \ldots, X[N-1]\}$, and computes an inverse discrete Fourier transform (IDFT), typically implemented using an inverse fast Fourier transform (IFFT), to produce the time domain samples $$x[n] = \frac{1}{N}\sum_{k=0}^{N-1} X[k]V_N^{nk}, n = 0, 1 \ldots, N-1 \quad (1)$$

where $$V_N = \exp\left(j\frac{2\pi}{N}\right) \quad (2)$$

The channel is modeled as a linear ISI channel with normalized delay spread of L and impulse response coefficients $\{h[m], m=0, 1 \ldots, L\}$. The time-domain samples (1) may be prepended with a CP, which is a copy of the final portion of the original sequence $\{x[n]\}$. The resulting sequence of samples constitutes an OFDM-symbol. The CP is assumed to be longer than the channel delay spread. These baseband samples are serialized, filtered, up-converted and amplified for transmission. The channel impulse response $h[n]$ may represent an aggregate response of the transmit filtering, the physical channel, and the receive filtering.

At the receiver, the baseband observable is modeled as $$z[n]=h[n]*x[n]+w[n], n=0, \ldots, N-1 \quad (3)$$

where * denotes linear convolution, and $\{w[n]\}$ is a sequence of noise samples typically modeled to be independently and identically distributed (i.i.d.) zero-mean Gaussian random variables. When the CP is longer than the channel delay spread, linear convolution and circular convolution are identical over the original N OFDM samples and a multiplicative model in frequency-domain is valid. The standard baseband OFDM receiver strips off the CP and takes a discrete Fourier transform (DFT) to obtain $$Z[k]=H[k]X[k]+W[k], k=0,1 \ldots, N-1 \quad (4)$$

where $\{H[k]\}$ is the N-point DFT of the channel response $\{h[m]\}$, and $\{W[k]\}$ is the N-point DFT of noise sequence $\{w[n]\}$. $\{W[k]\}$ are also i.i.d. Gaussian noise samples. The complex baseband quantity $H[k]$ is also known as the (channel) gain of subcarrier-k.

The baseband PAPR of an OFDM signal with N-subcarriers is defined as $$PAPR_{OFDM(N)} = \frac{\max_{n=0,\ldots,N-1} |x[n]|^2}{\frac{1}{N}\sum_{n=0}^{N-1}|x[n]|^2} \quad (5)$$

where the numerator represents the peak squared magnitude and the denominator represents the average squared magnitude of the time-domain samples of a particular OFDM-symbol. The value of the PAPR will fluctuate from one symbol to the next, and in practice, depends on the modulation format and as well as the number of subcarriers, N.

The PAPR of the analog waveform (passband PAPR) depends on the exact digital-to-analog conversion method used but is generally driven by the baseband PAPR given in (5).

FIG. 1 also displays a baseband demodulator that, after CP removal, converts received time-domain samples to frequency-domain via a DFT and computes decisions on or estimates of original data symbols using a set of channel subcarrier gains. For example, the decision computer may compute negative log-likelihood metrics $$-\log p(Z[k]|X[k]=X;H[k]), X \in \Psi_k \quad (6)$$

where $\Psi_k$ denotes the finite QASK alphabet from which $X[k]$ is chosen, and $p(Z[k]|X; H[k])$ is the conditional probability density of $Z[k]$ given $X[k]=X$ parameterized by the subcarrier gain $H[k]$. Such decisions that provide confidence for each possible data symbol in the alphabet are called soft-decisions. The decision computer may also compute hard-decisions on the data samples, in the form of a single final estimate of the data symbol. One such decision is the maximum-likelihood estimate, given by $$\hat{X}_{ML}[k] = \arg\min_{X \in \Psi_k} -\log p(Z[k] | X[k] = X; H[k]) \quad (7)$$
$$= \arg\min_{X \in \Psi_k} |Z[k] - H[k]X|^2$$

A hard-decision on a digital symbol drawn from a finite signal set (or alphabet) is one element of the signal set that is selected by the receiver as the best decision (e.g., as per (7)). Soft-decisions comprise a list or table of reliability measures that provide the information in the hard-decision plus additional information regarding the reliability of this decision. For example, the negative-log likelihood quantities in (7) provide a common soft-decision. A related concept is a soft symbol estimate which is a single estimate of the symbol that is not constrained to be an element of the signal set. Various receiver processing algorithms that follow the processing described in accordance with the various embodiments of the invention may utilize hard-decisions, soft-decisions, or soft estimates of the data symbols. The symbol decision/estimate computer device (101) of FIG. 1 (and those of subsequent embodiments) may compute soft-decisions (e.g., (6)), hard-decisions (e.g., (7)), or soft sample estimates (e.g., minimum-mean-squared-estimate (MMSE) sample estimator (27)).

In practice, $H[k]$ is replaced by its estimate. Modern OFDM systems typically employ forward-error-correction (FEC) methods in which receive-side decoders accept soft-decisions. It is also possible to compute estimates of the data samples as an initial stage before any data symbol decision is made. This possibility is also indicated in FIG. 1.

Baseband CM-OFDM Modulation

Baseband CM Condition:

Let $\{x[n]\}$ be the inverse N-point discrete Fourier transform (IDFT) of $\{X[k]\}$. Then, the sequence of squared-magnitudes, $\{|x[n]|^2\}$ is the N-point IDFT of the circular autocorrelation of $\{X[k]\}$. A condition for constant $|x[n]|$ is that the circular autocorrelation of $\{X[k]\}$ should be a delta function. In particular, $|x[n]|^2=1$ for $n=0, 1, \ldots, N-1$ if $k=0, 1, \ldots, N-1$ $$\sum_{l=0}^{N-1} X[l]X^*[(l-k)_N] = N^2\delta[k], \quad (8)$$

where $(n)_N$ indicates n-modulo-N, and $$\delta[k] = \begin{cases} 1, k = 0 \\ 0, k \neq 0 \end{cases} \quad (9)$$

is the discrete-index delta function. For even values of N, the condition (8) results in N/2 independent equations with N unknowns, therefore N/2 of the subcarriers can be chosen independently (i.e. can serve as data subcarriers). The remaining half of the carriers will be determined as a function of the data subcarriers according to (8).

Figure 2:
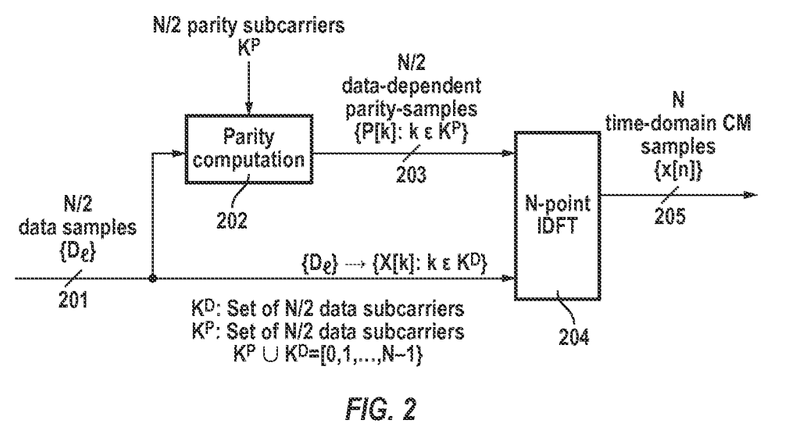
FIG. 2 describes an exemplary CM-OFDM modulator in accordance with an embodiment of the present invention.

FIG. 2 illustrates an exemplary CM-OFDM modulator with N subcarriers in accordance with an embodiment of the present invention. The modulator takes N/2 information-bearing QASK symbols $\{D_l\}$ (201) which are which are mapped onto N/2 subcarriers with index set $K^D \subset \{0, 1, \ldots, N-1\}$. The remaining subcarriers with index set $K^P$ are loaded symbols $\{P_l\}$ which are derived (202) from $\{D_l\}$ according to the CM condition of (8). The output (205) of the IDFT (204) has therefore no magnitude variation. In a manner akin to forward error-correction-coding, the computed symbols $\{P_l\}$ are called parity symbols. In this respect, CM-OFDM implements a rate-1/2 modulation-code in the frequency-domain. Since the data symbols appear in the codewords, the modulation code is a systematic code. The data symbols $\{D_l\}$ in X are therefore also called systematic symbols.

Even-Odd CM-OFDM Modulation

Figure 3:
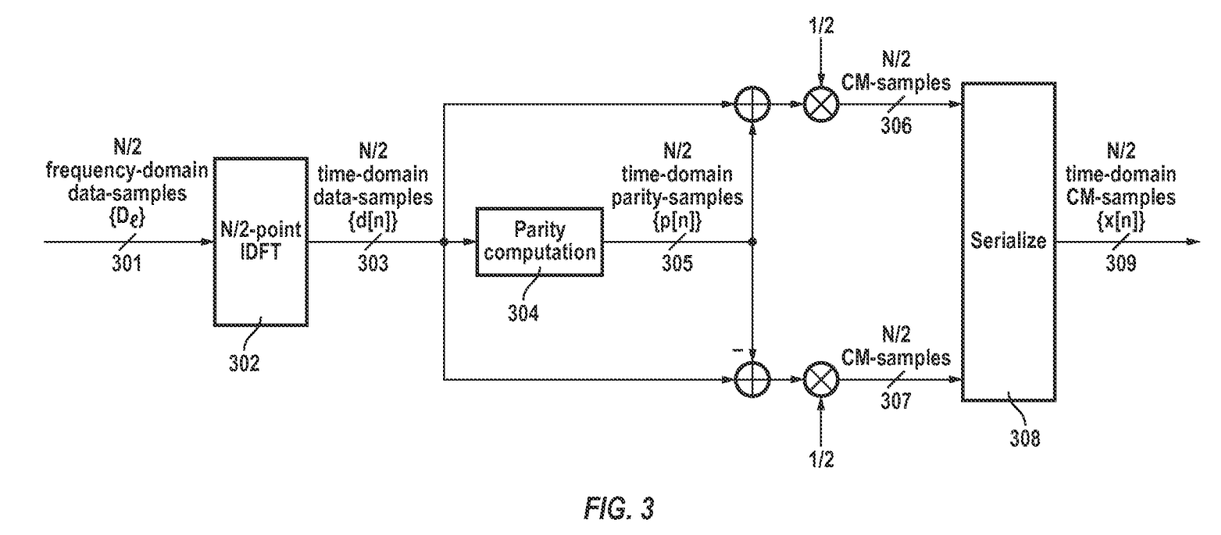
FIG. 3 describes an exemplary even-odd CM-OFDM modulator in which even-numbered subcarriers are loaded with independent data symbols and odd numbered subcarriers are loaded with data-dependent parity symbols in accordance with an embodiment of the present invention.

In an embodiment of the CM-OFDM modulator, N/2 independent data symbols load even-numbered subcarriers, whereas the odd-numbered subcarriers are loaded by parity symbols. This embodiment is called even-odd CM-OFDM. In this embodiment, the time-domain samples are given by $$x[n] = \frac{1}{N}\sum_{m=0}^{N-1} X_m V_N^{km} \quad (10)$$

$$= \frac{1}{N}\left(\sum_{k=0}^{N/2-1} D_k V_N^{2kn} + \sum_{k=0}^{N/2-1} P_k V_N^{(2k+1)n}\right)$$

$$= \frac{1}{2}\left(\sum_{k=0}^{N/2-1} D_k V_{N/2}^{nk} + V_N^n \cdot \sum_{k=0}^{N/2-1} P_k V_{N/2}^{nk}\right)$$

$$= \frac{1}{2}(d[n] + V_N^n \cdot p[n])$$

where $V_N$ is defined in (2), $\{d[n]\}$ is the N/2-point IDFT of $\{D[k]=D_k\}$, and $\{p[n]\}$ is the N/2-point IDFT of $\{P[k]=P_k\}$. Both $\{d[n]\}$ and $\{p[n]\}$ are periodic with period N/2, yielding $$x[n+N/2] = \frac{1}{2}(d[n] + V_N^{n+N/2} \cdot p[n]) \quad (11)$$

$$= \frac{1}{2}(d[n] - V_N^n \cdot p[n]), n = 0, \ldots, N/2-1.$$

When imposed on (10) and (11), the time-domain CM condition $$|x[n]|=|x[n+N/2]|=\rho, n=0,\ldots,N/2-1 \quad (12)$$

implies $$Re\{d^*[n]V_N^n p[n]\}=0 \quad (13)$$

and the time-domain CM-OFDM samples are given by $$x[n] = \begin{cases} \frac{1}{2}(d[n] + ja[n]d[n]), n = 0, \ldots, N/2-1 \\ \frac{1}{2}(d[n] - ja[n]d[n]), n = N/2, \ldots, N-1 \end{cases} \quad (14)$$

where $$a[n] = \pm\sqrt{\frac{\rho^2}{|d[n]|^2} - 1}. \quad (15)$$

Without loss of generality, we use (15) with the positive sign. Writing $$d[n]=r[n]\exp(j\theta[n]) \quad (16)$$

in polar coordinates, an equivalent representation of (14) is $$x[n] = \begin{cases} \frac{1}{2}\left(r[n] + j\sqrt{\rho^2 - r[n]^2}\ e^{j\theta[n]}\right), n = 0, \ldots, N/2-1 \\ \frac{1}{2}\left(r[n] - j\sqrt{\rho^2 - r[n]^2}\ e^{j\theta[n]}\right), n = N/2, \ldots, N-1 \end{cases} \quad (17)$$

The time-domain constant magnitude, p, therefore is greater than the largest magnitude of the time-domain samples d[n], i.e.

$$\rho \geq \max_{0 \leq n < N}|d[n]|. \quad (18)$$

FIG. 3 depicts the even-odd CM-OFDM modulator which consists of an N/2-point IDFT (302), a time-domain parity computation unit (304) and injection of parity (306, 307) in accordance with an embodiment of the present invention. Note that the even-odd CM-OFDM modulator does not compute the frequency-domain parity symbols $\{P_l\}$ explicitly. Parity is injected in time-domain according to (16)-(18). Also note that the order of sequence of x[n] in (15) could be arbitrary (308).

The largest magnitude (18) of time-domain samples of a CM-OFDM symbol depends on the particular frequency-domain symbol sequence $D=\{D_k\}$ that comprises the CM-OFDM symbol. Consider a burst of M such sequences, $D^{(m)}=\{D_l^{(m)}\}$, m=0, 1, \ldots, M-1. Since the CM-OFDM burst will be driving a saturated amplifier, samples from all symbols will be amplified to the same implicit power level, P. If $\rho^{(m)}$ is the value for the mth CM-OFDM symbol that determines the time-domain parity sample (13)-(14), then the symbol will be scaled by $$\alpha^{(m)} = \frac{\sqrt{P}}{\rho^{(m)}}, \quad (19)$$

and the time-domain samples of the mth CM-OFDM symbol will be given by $$x^{(m)}[n] = \begin{cases} \frac{\alpha^{(m)}}{2}(d^{(m)}([n] + ja^{(m)}[n]d^{(m)}[n]), & n = 0, \ldots, N/2-1 \\ \frac{\alpha^{(m)}}{2}(d^{(m)}[n] - ja^{(m)}[n]d^{(m)}[n]), & n = N/2, \ldots, N-1 \end{cases} \quad (20)$$

where $a^{(m)}[n]$ is determined by (13) using $\rho^{(m)}$. Let $$R^{(m)} \approx \max_{0 \leq n < N}|d^{(m)}[n]| \quad (21)$$

The power in parity samples is minimized by selecting $\rho^{(m)}=R^{(m)}$, m=0, 1, \ldots, M-1.

Let $P_{data}$ and $P_{parity}$ be the power in the samples that is due to data-only samples ($\{d^{(m)}[n]\}$) and parity samples ($\{p^{(m)}[n]\}$) respectively. With the choice of $\rho^{(m)}=R^{(m)}$, the ratio of the total symbol power (data plus parity) to data-only power is equal to the PAPR of a conventional OFDM modulator with N/2 subcarriers.

$$\frac{P_{data} + P_{parity}}{P_{data}} = \frac{\frac{1}{N}\sum_{n=0}^{N}|x^{(m)}[n]|^2}{\frac{1}{N}\sum_{n=0}^{N}\left|\frac{1}{2}d^{(m)}[n]\right|^2} \quad (22)$$

$$= \frac{(R^{(m)})^2}{\frac{1}{N}\sum_{n=0}^{N}\left|\frac{1}{2}d^{(m)}[n]\right|^2}$$

$$= PAPR_{OFDM(\frac{N}{2})}$$

Baseband CM-OFDM Demodulation

Methods for demodulating the received baseband CM-OFDM signals are presently described starting with simple demodulators for frequency-flat channels. The simplest frequency-flat channel is the AWGN channel in which the channel impulse response can be idealized as a delta function $$h_{AWGN}[m]=\delta[m] \quad (23)$$

Consequently, the frequency-domain samples of the channel impulse response are all unity $$H_{AWGN}[k]=1, k=0,1,\ldots,N-1, \quad (24)$$

such that $$Z[k]=X[k]+W[k] \quad (25)$$

Figure 4:
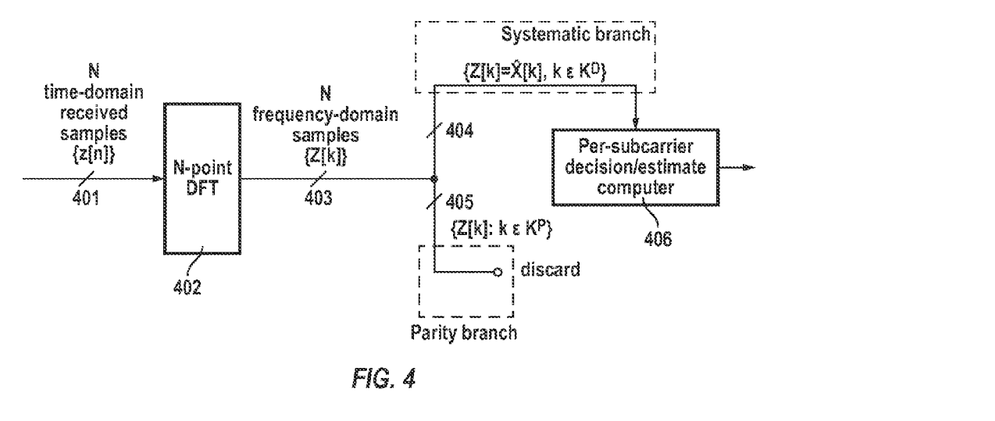
FIG. 4 describes an exemplary systematic-only baseband CM-OFDM demodulator for frequency-flat channels in accordance with an embodiment of the present invention.

The simplest baseband CM-OFDM demodulator, an example of which is illustrated in FIG. 4, first transforms the received time-domain samples to the frequency-domain by means of a DFT, much like the conventional baseband OFDM demodulator of FIG. 1. The demodulator then delivers decisions on the data symbols on a per-subcarrier basis (since the frequency-domain noise sequence W is uncorrelated). For example, the decision computer may compute scaled negative log-likelihoods in the form of square metrics $$\{|Z[k]-X|^2, k \in K^D\} \quad (26)$$

for each data subcarrier. As such, the frequency-domain samples on the data subcarriers (404) serve as estimates of the respective transmitted data samples. It is noted that even for the ideal AWGN channel of (23), the decisions delivered by the simple CM-OFDM demodulator will be suboptimal due to discarding of the data-dependent parity samples that could otherwise aid in data decisions.

Figure 5:
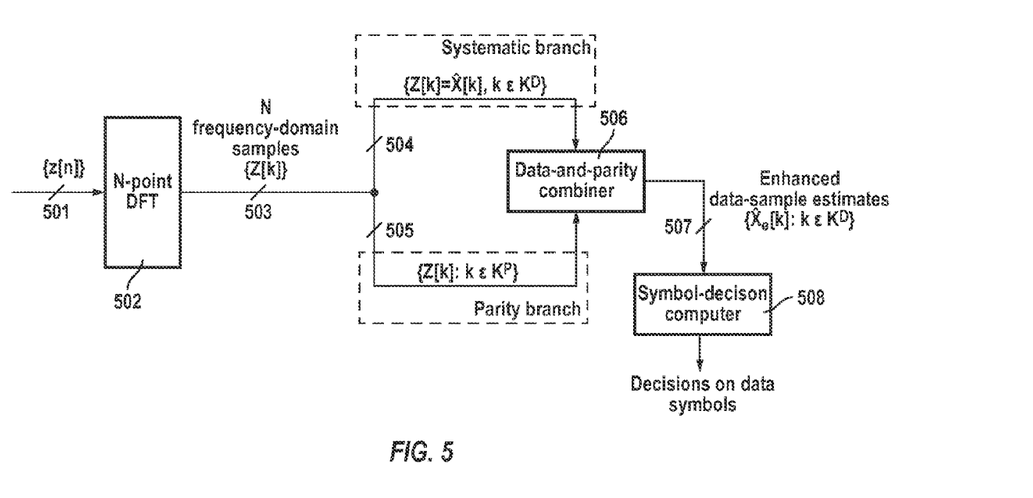
FIG. 5 describes an exemplary baseband CM-OFDM demodulator for frequency-flat channels that uses parity-combining in accordance with an embodiment of the present invention.

A more sophisticated baseband CM-OFDM demodulator for the AWGN channel combines data-dependent parity samples with the data samples. An exemplary embodiment for such a demodulator is provided in FIG. 5, in which the combiner device (506) delivers an enhanced estimate (507) of the data samples (in comparison to the initial estimates (505)) that are then fed to a decision computer device (508) that delivers decisions on data symbols. The combiner device exploits the dependency of the parity samples on the data samples as expressed in (8). Some methods for data and parity combining will be discussed for practical demodulation of baseband even-odd CM-OFDM signals.

Figure 6:
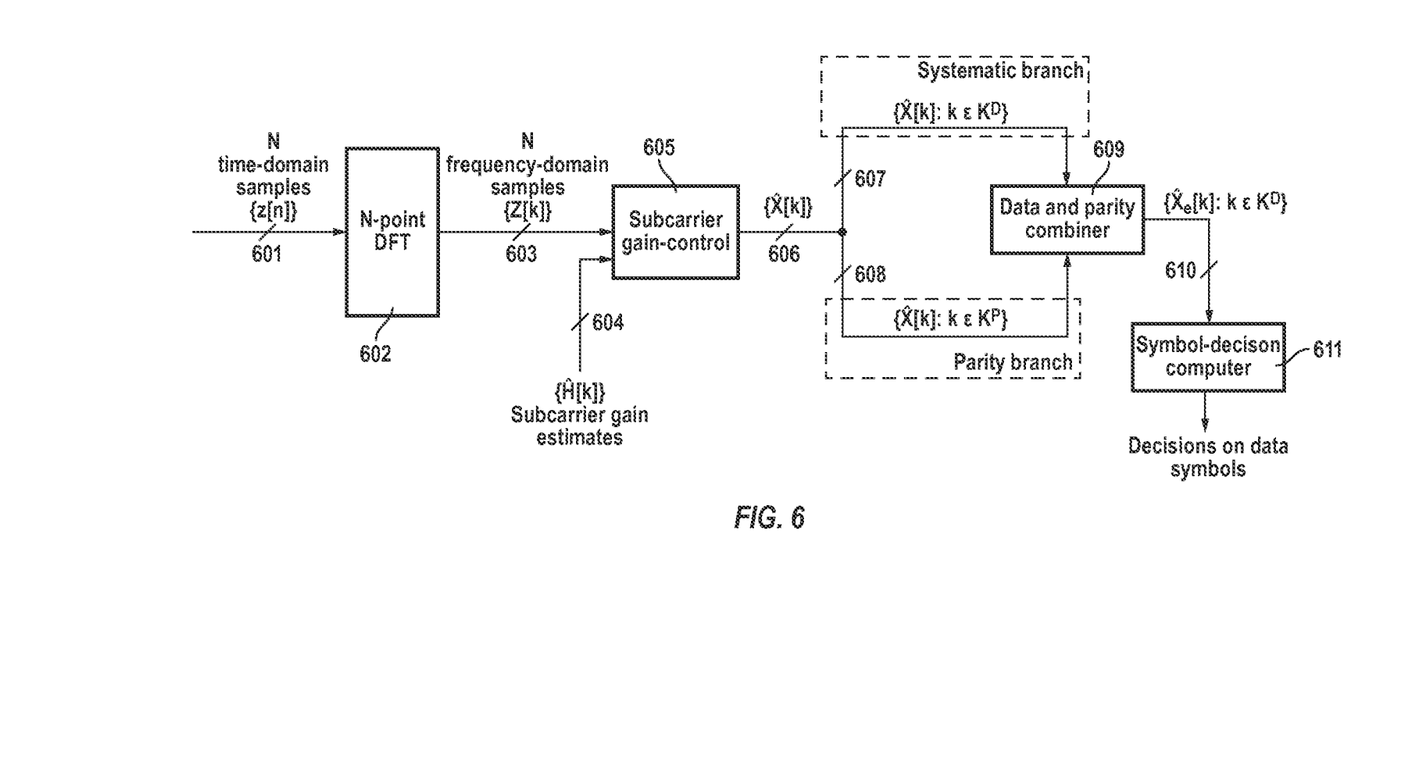
FIG. 6 describes an exemplary baseband CM-OFDM demodulator using subcarrier gain-control for frequency-selective channels and parity-combining in accordance with an embodiment of the present invention.

In general, a baseband CM-OFDM demodulator has to account for frequency-selectivity of the channel response. An exemplary embodiment for a baseband CM-OFDM demodulator is shown in FIG. 6, in which a subcarrier-gain control device (605) is introduced to undo the frequency-selectivity of the channel response (604). A common gain-control method is the MMSE gain-control in which an estimate of the sample on the kth subcarrier is given by $$\hat{X}_{MMSE}[k] = \frac{H^*[k]}{|H[k]|^2 + \sigma^2}Z[k] \quad (27)$$

where H[k] is the subcarrier gain and $\sigma^2$ is the variance of the i.i.d. Gaussian noise samples {W[k]}(4). Typically the output (606) of the subcarrier gain-control stage is be approximated as $$\hat{X}[k] \approx X[k] + N[k] \quad (28)$$

where {N[k]} is a sequence of independent Gaussian noise samples with possibly different variances (due to frequency-dependent gain control). For this frequency-flat channel induced by the actual channel and subcarrier-gain-control, the demodulator devices of paragraphs [0039]-[0042] apply.

Figure 7:
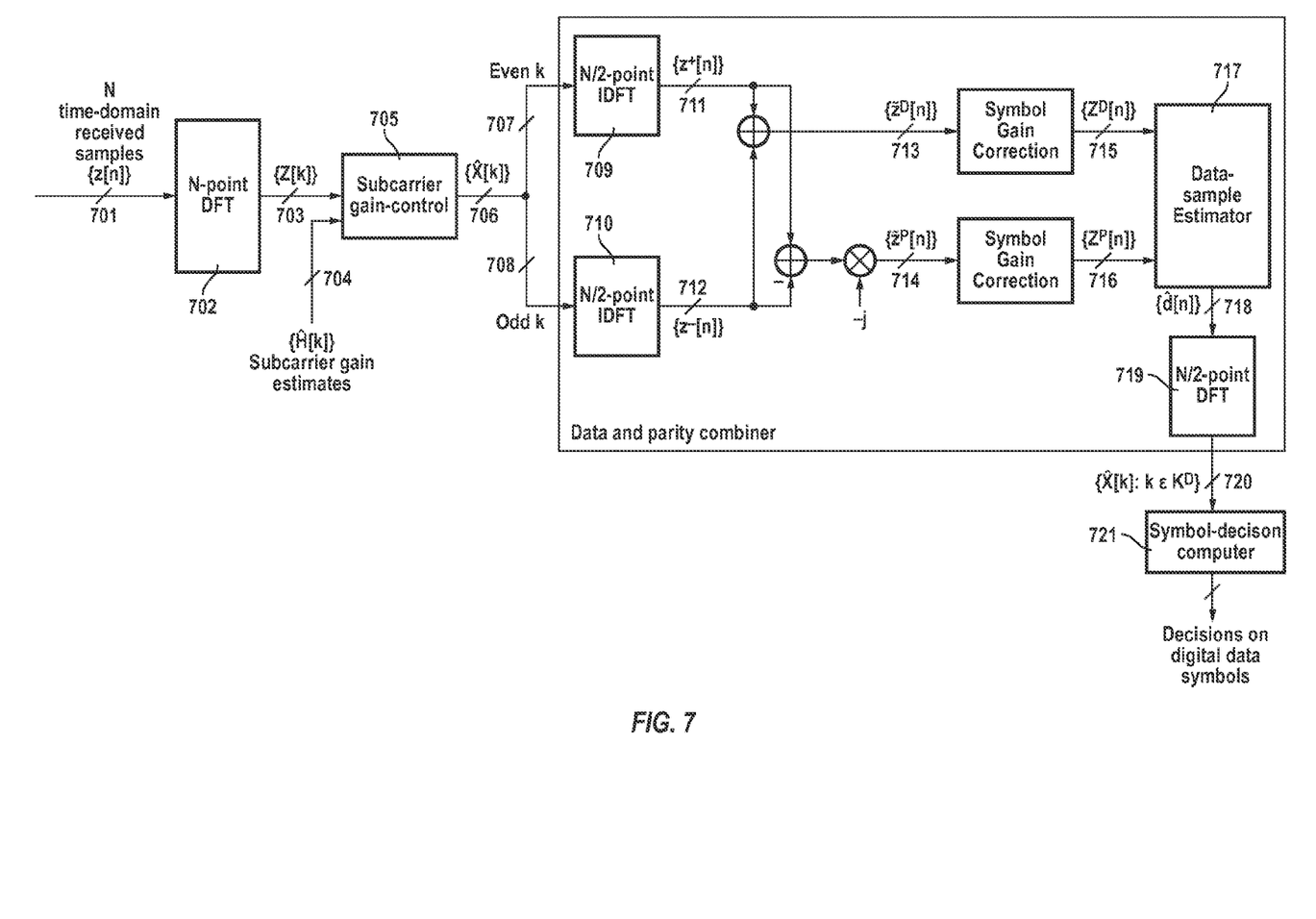
FIG. 7 describes an exemplary baseband even-odd CM-OFDM demodulator using subcarrier gain-control for frequency-selective channels and parity-combining in accordance with an embodiment of the present invention.

Some embodiments of the present invention demodulate CM-OFDM signals generated by the even-odd CM-OFDM modulator as described in paragraphs [0031]-[0035]. In the exemplary embodiment depicted in FIG. 7, the time-domain samples (701) of the received OFDM symbol are first transformed (after CP removal) to frequency-domain by an N-point DFT (702). The frequency domain samples (703) then undergo subcarrier-gain control (704) whose job is to produce (noisy) estimates (706) of the frequency-domain samples. The resulting sequence is then split into two branches: a systematic (data) branch (707) that contains the samples from the even-indexed subcarriers, and a parity branch (708) that contains the samples from the odd-indexed subcarriers. The sequences in both branches are then transformed back to the time-domain via N/2-point IDFTs (709, 710). The output (711) of the IDFT for the systematic branch is an N/2-point sequence denoted as $\{z^+[n]\}$, and the output (712) of the IDFT for the parity branch is an N/2-point sequence denoted as $\{z^-[n]\}$ and are given by $$z^+[n] = \frac{\alpha}{2}(d[n] + ja[n]d[n]) + w^+[n] \quad (29)$$

$$z^-[n] = \frac{\alpha}{2}(d[n] - ja[n]d[n]) + w^-[n]$$

where $\{w^-[n]\}$ and $\{w^-[n]\}$ are post-gain-control time-domain noise sequences, and $\alpha$ is the CM-OFDM symbol gain introduced in equation (19). The sequences $\{z^+[n]\}$ and $\{z^-[n]\}$ are then converted to produce (scaled) noisy versions of the data-samples (713) and those of the data-samples (714) as $$\tilde{z}^D[n] = z^+[n] + z^-[n] \quad (30)$$

$$= \alpha r[n]e^{j\theta[n]} + \tilde{w}^D[n]$$

$$\tilde{z}^P[n] = -j(z^+[n] - z^-[n])$$

$$= \alpha\sqrt{R^2 - r[n]^2}\,e^{j\theta[n]} + \tilde{w}^P[n]$$

where $\tilde{w}^D[n]=w^+[n]+w^-[n]$, and $\tilde{w}^P[n]=w^+[n]-w^-[n]$. Both sequences undergo symbol-gain correction (715) that accounts for the OFDM symbol-gain (19). An estimate of the CM-OFDM symbol gain is given by $$\hat{\alpha}^{-1} = \frac{\frac{1}{N/2}\sum_{n=0}^{N/2}|\tilde{z}^D[n]| - 2E|w^D[n]|^2}{E|d[n]|^2} \quad (31)$$

At the output of the gain correction stages are noisy versions of the time-domain data-samples and those of the data-dependent parity samples which, in polar form, are given as $$z^D[n]=\hat{\alpha}^{-1}\tilde{z}^D[n]\approx r[n]e^{j\theta[n]}+w^D[n]$$

$$z^P[n]=\hat{\alpha}^{-1}\tilde{z}^P[n]\approx\sqrt{R^2-r[n]^2}e^{j\theta[n]}+w^P[n] \quad (32)$$

It can be shown that when the symbol gain scale is known, $w^D[n]$ and $w^P[n]$ are i.i.d. Gaussian random variables for each n, and therefore an estimate of the time-domain data sample d[n] can be obtained using the pair ($z^D[n]$, $z^P[n]$). This is accomplished by a data-sample estimator device (717). The resultant sequence of estimated time-domain data samples (718) is transformed back to the frequency-domain via an N/2-point DFT (719) to yield the estimated sequence of frequency-domain data-samples (720), which then can be fed to a symbol-decision computer (721) to produce decisions on digital modulation symbols. Exemplary embodiments of the data-sample estimator device are provided next.

Systematic-Only Data-Sample Estimator:

One embodiment of the data-sample estimator (717) bases its estimate of d[n] solely based on $z^D[n]$, discarding time-domain parity sample information. Such an estimator (and the associated demodulator) is a systematic-only estimator (demodulator). For example, the systematic-only maximum-likelihood estimate of d[n] is given by $$\hat{d}_{ML,sys-only}[n] = \mathrm{argmax}_d \log p(z^D[n] \mid d[n] = d) \quad (33)$$
$$= z^D[n]$$

Systematic-and-Parity Combining Data-Sample Estimator:

Another embodiment of the data-sample estimator (717) uses both the noisy parity sample $z^P[n]$ and the noisy data sample $z^D[n]$ to form generalized maximum-likelihood (GML) estimate of {d[n]}:

$$\hat{d}_{GML}[n]=\arg\max_{d,R} \log p(z^D[n], z^P[n]|R, d[n]=d) \quad (34)$$

which maximizes the log-likelihood of the observed sample pair $z^D[n]$ and $z^P[n]$ over the unknown nuisance parameter R as well as the desired data sample d[n]. Define, for $\mathrm{Re}\{a^*b\}\neq 0$, $$\lambda(a, b) = \frac{(|a|^2 - |b|^2)^2}{\mathrm{Re}\{a^*b\}} \quad (35)$$

and $$\delta(a, b) = \begin{cases} \begin{cases} \sqrt{\frac{\lambda(a,b)^2}{\lambda(a,b)^2+4}}, & |a|\geq|b| \\ \sqrt{\frac{\lambda(a,b)^2}{\lambda(a,b)^2+4}}, & |a|<|b| \end{cases}, & \mathrm{Re}\{a^*b\}\neq 0 \\ \begin{cases} 1, & |a|\geq|b| \\ -1, & |a|<|b| \end{cases}, & \mathrm{Re}\{a^*b\}=0 \end{cases} \quad (36)$$

It can be shown that GML estimate (34) of d[n] is given by $$\hat{d}_{GML}[n] = \hat{r}_{GML}[n]e^{j\hat{\theta}_{GML}[n]} \quad (37)$$

where $$\hat{r}_{GML}[n] = R_o\sqrt{\frac{1}{2}(1+\delta(z^D[n], z^P[n]))} \quad (38)$$

$$\hat{\theta}_{GML}[n] = \arg\left(z^D[n]\hat{r}_{GML}[n] + z^P[n]\sqrt{R_o^2 - \hat{r}_{GML}[n]^2}\right)$$

are the GML estimates of r[n] and θ[n], respectively, and $R_o$ is given by $$R_o = \frac{1}{N/2}\sum_{n=0}^{N/2-1}\left|z^D[n]\frac{1+\delta(z^D[n],z^P[n])}{2} + z^P[n]\frac{1+\delta(z^D[n],z^P[n])}{2}\right|. \quad (39)$$

Figure 8:
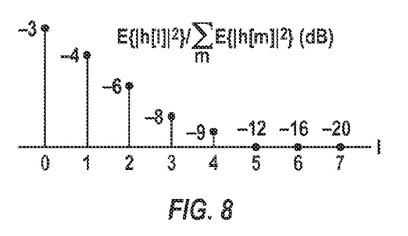
FIG. 8 describes the power-delay-profile of a test-ISI channel utilizing embodiments of the present invention.

Simulation Results:

The utility of some embodiments is demonstrated by simulating the error-rate performance of a reference coded even-odd CM-OFDM system over the AWGN channel (23) as well as a frequency-selective ISI test channel whose power-delay profile is depicted in FIG. 8. The reference systems in this example are configured to produce CM-OFDM bursts (blocks), each containing 4 kilobits of information bits coded using the Flexible Low-Density Parity-Check (F-LDPC) codes of TrellisWare Technologies, Inc. of San Diego, Calif. The block-error-rate performance of even-odd CM-OFDM systems with demodulators using two practical data-sample estimators (paragraphs [0047]-[0049]) and a genie-based (non-realizable) estimator is compared to the block-error-rate performance of a conventional OFDM system. All modulators use N=256 subcarriers and a CP length of 16 samples. All demodulators use log-likelihood (soft) decision metric extraction with estimated subcarrier gains.

The data-sample estimator of the non-realizable (genie) CM-OFDM demodulator is provided with (i) the CM-OFDM symbol gain estimates, and (ii) the data-dependent multiplier a[n] of (15) such that the noisy data-sample and the noisy parity-sample of (32), reproduced as $$z^D[n]=d[n]+w^D[n]$$

$$z^P[n]=a[n]d[n]+w^P[n] \quad (40)$$

The genie estimator then forms the maximum-likelihood (ML) estimate of d[n] based on (40), and assuming a[n] is known and a data-independent multiplier. This estimate, also known as the genie maximal-ratio-combining (genie-MRC) estimate, is given by $$\hat{d}_{MRC\text{-}genie} = \frac{z^D[n]+a[n]z^P[n]}{1+|a[n]|^2} \quad (41)$$

The performance of the genie-MRC demodulator is considered to be an upper-bound on the performance of the CM-OFDM demodulators that employ subcarrier gain-control.

Figure 9:
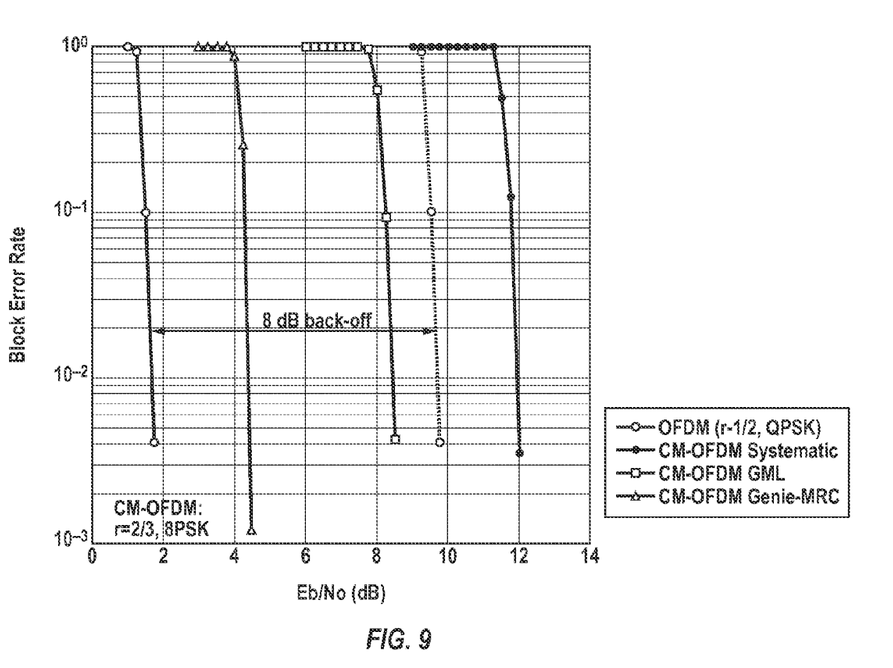
FIG. 9 depicts block-error-rate performance on an additive white Gaussian noise (AWGN) channel at a spectral efficiency of 1 bit/sec/Hz utilizing embodiments of the present invention.
Figure 10:
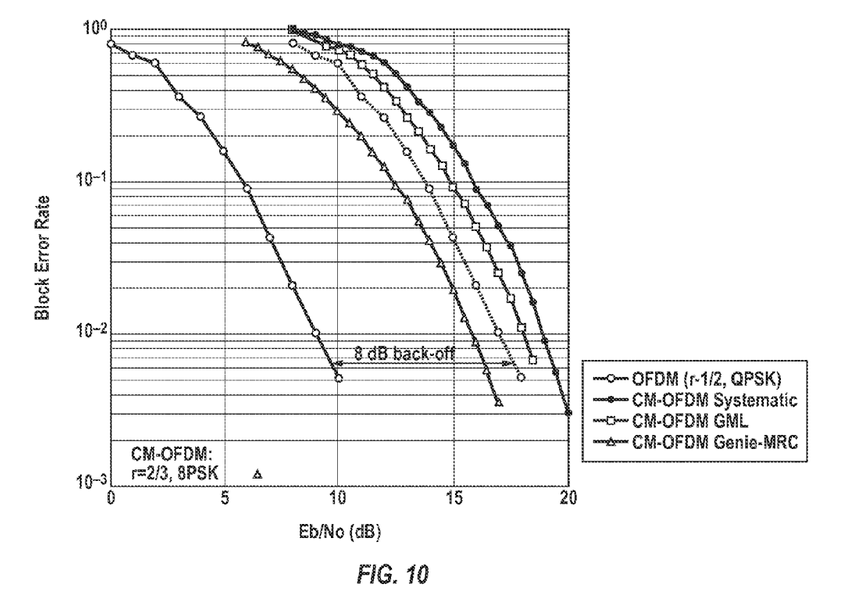
FIG. 10 depicts block-error-rate performance on a test ISI channel at a spectral efficiency of 1 bit/sec/Hz utilizing embodiments of the present invention.

FIG. 9 and FIG. 10 display the simulated block-error-rate performance of the systems in comparison as a function of the bit-energy-to-noise-spectral-density ratio (Eb/N0), observed on the AWGN channel and the test ISI-channel, respectively. In this example, conventional OFDM transmitter uses a rate-1/2 F-LDPC code that encodes a sequence of 4096 information bits into a codeword of 8192 bits, which are used to map QPSK symbols that load all 256 subcarriers of 16 OFDM symbols that make up the transmit burst. The CM-OFDM transmitter uses a rate-2/3 F-LDPC code that encodes a sequence of 4096 information bits into a codeword of 6144 codeword bits, which are used to map 8PSK symbols that load the even-indexed 128 subcarriers for each of the 16 CM-OFDM symbols that make up a transmit burst. Both the conventional OFDM transmitter and the CM-OFDM transmitter operate at a spectral efficiency of approximately 1 bit/sec/Hz.

On the AWGN channel, the CM-OFDM system with GML data-sample estimator (paragraphs [0048]-[0049]) performs about 7 dB worse than the conventional OFDM system, whereas the loss for the CM-OFDM system with the genie-MRC-based data-sample estimator is only 3 dB.

On the test ISI-channel, the CM-OFDM system with the GML data-sample estimator (paragraphs [0048]-[0049]) performs about 9 dB worse than the conventional OFDM system, whereas the loss for the CM-OFDM system with the genie-MRC-based data-sample estimator is about 7 dB.

The CM-OFDM system can drive the power amplifier near its saturation, while the conventional OFDM system needs to operate with a power back-off. For the case of an 8 dB power back-off, the error-performance curves for the conventional OFDM systems are also displayed for reference.

The small performance gain of the CM-OFDM demodulator using the GML data-sample estimator over the systematic-only CM-OFDM demodulator implies that only a fraction of the pilot energy, which dominates the overall symbol energy, is translated into increasing the reliability of symbol detection.

Controlled-Modulus OFDM:

To alleviate the high ratio of parity-energy to data-energy, the parity multiplier of (15) may be modified as $$a[n] = \begin{cases} \sqrt{\dfrac{R^2}{r[n]^2} - 1}, & r[n] > R_0 \\ \sqrt{\dfrac{R_0^2}{r[n]^2} - 1}, & r[n] \leq R_0 \end{cases} \quad (42)$$

where $R_0$ is an intermediate magnitude $$0 \leq R_0 < R = \max_{n=0,1,\ldots,N/2} |r[n]| \quad (43)$$

such that the proposed waveform exhibits a controlled amount of magnitude variation. Such a relaxation of the constant-modulus OFDM waveform is called here a CoM-OFDM waveform for which equation (22) generalizes to $$\frac{P_{data} + P_{parity}}{P_{data}} = \frac{PAPR_{OFDM(\frac{N}{2})}}{PAPR_{CoM\text{-}OFDM(N)}} \quad (44)$$

which implies that the power loss due to insertion of parity samples so as to satisfy the CM condition (no magnitude variability) can be decreased at the expense of baseband magnitude variability by the same amount.

It should be appreciated that some embodiments of the present invention may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

The terms "invention," "the invention," "this invention" and "the present invention" used herein are intended to refer broadly to all of the subject matter and the claims below. Statements containing these terms should not be understood to limit the subject matter described herein or to limit the meaning or scope of the claims below.

Although specific embodiments of the present invention have been described in detail, it will be apparent to one skilled in the art that various changes and modification can be made therein without departing from the spirit and scope thereof. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for reducing or eliminating a peak-to-average power ratio (PAPR) of baseband subcarriers of an OFDM signal, comprising:
    loading a first portion of the baseband subcarriers with data symbols; and
    loading a second portion of the baseband subcarriers with parity symbols that are dependent on the data symbols, wherein the parity symbols reduce or eliminate the PAPR of the baseband subcarriers of the OFDM signal.

2. The method of claim 1 wherein the first portion of the baseband subcarriers comprise even-numbered subcarriers of the OFDM signal and the second portion of the baseband subcarriers comprise odd-numbered subcarriers of the OFDM signal.

3. The method of claim 2 wherein time-domain counterparts of the parity symbols in a frequency-domain are in closed form.

4. The method of claim 2 wherein the parity symbols in a frequency-domain are not computed explicitly.

5. The method of claim 2 wherein parity is provided in time-domain counterparts of the parity symbols in a frequency-domain.

6. A modulator for reducing or eliminating a peak-to-average power ratio (PAPR) of baseband subcarriers of an OFDM signal, comprising:
    a mechanism for loading a first portion of the baseband subcarriers with data symbols; and
    a mechanism for loading a second portion of the baseband subcarriers with parity symbols that are dependent on the data symbols, wherein the parity symbols reduce or eliminate the PAPR of the baseband subcarriers of the OFDM signal.

7. The modulator of claim 6 wherein the first portion of the baseband subcarriers comprise even-numbered subcarriers of the OFDM signal and the second portion of the baseband subcarriers comprise odd-numbered subcarriers of the OFDM signal.

8. The modulator of claim 7 wherein time-domain counterparts of the parity symbols in a frequency-domain are in closed form.

9. The modulator of claim 7 wherein the parity symbols in a frequency-domain are not computed explicitly.

10. The modulator of claim 7 wherein parity is provided in time-domain counterparts of the parity symbols in a frequency-domain.

11. A non-transitory computer-readable medium embodying program code executable by a computing system, the program code for reducing or eliminating a peak-to-average power ratio (PAPR) of baseband subcarriers of an OFDM signal, the program code comprising:

program code for loading a first portion of the baseband subcarriers with data symbols; and program code for loading a second portion of the baseband subcarriers with parity symbols that are dependent on the data symbols, wherein the parity symbols reduce or eliminate the PAPR of the baseband subcarriers of the OFDM signal.

12. The non-transitory computer-readable medium of claim 11 wherein the first portion of the baseband subcarriers comprise even-numbered subcarriers of the OFDM signal and the second portion of the baseband subcarriers comprise odd-numbered subcarriers of the OFDM signal.

13. The non-transitory computer-readable medium of claim 12 wherein time-domain counterparts of the parity symbols in a frequency-domain are in closed form.

14. The non-transitory computer-readable medium of claim 12 wherein the parity symbols in a frequency-domain are not computed explicitly.

15. The non-transitory computer-readable medium of claim 12 wherein parity is provided in time-domain counterparts of the parity symbols in a frequency-domain.

* * * * *